United States Patent Office 3,217,121
Patented Nov. 9, 1965

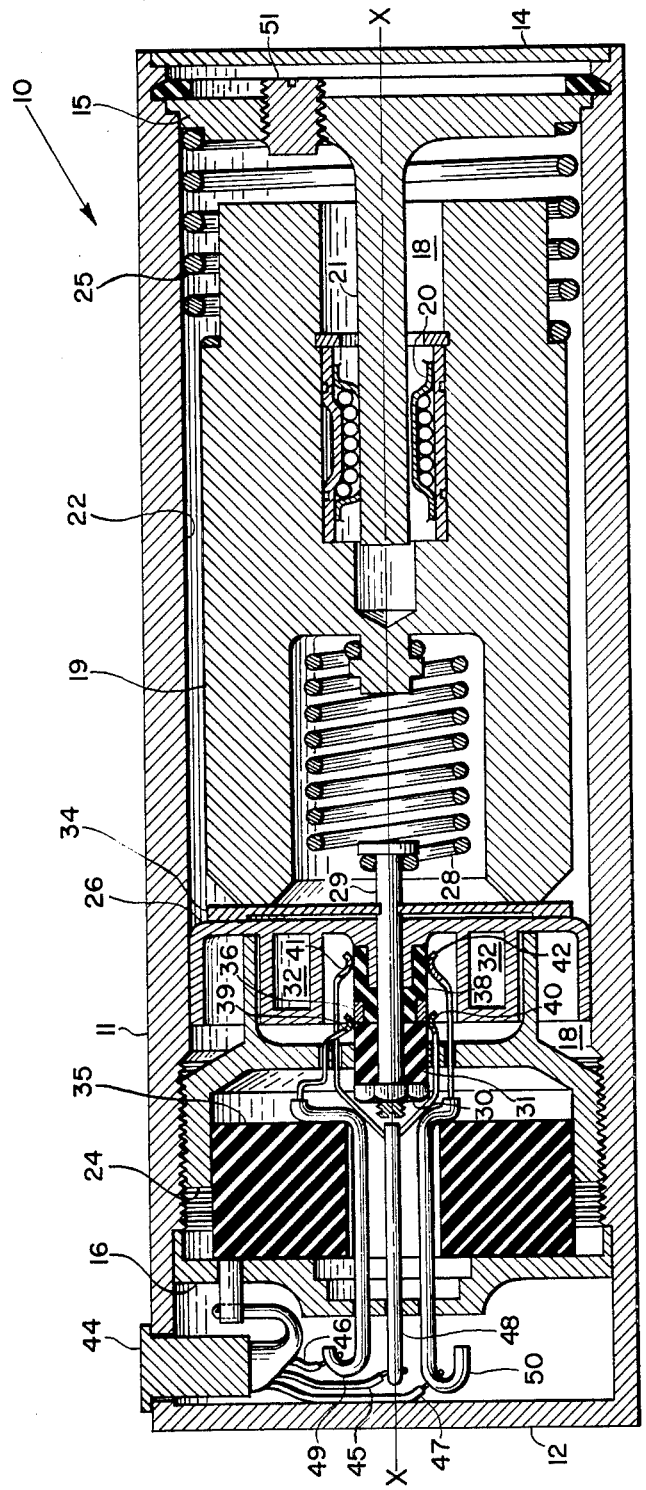

3,217,121
ACCELERATION SWITCH
Richard W. Hradek and Donald E. Rogness, Davenport, Iowa, assignors to The Bendix Corporation, Davenport, Iowa, a corporation of Delaware
Filed Aug. 27, 1962, Ser. No. 219,683
6 Claims. (Cl. 200—61.53)

This invention relates to an acceleration sensitive device and more particularly to an acceleration sensitive mechanism for activating a switch after a predetermined minimum acceleration has existed for a predetermined time interval.

Accelerometers produce an indication of the magnitude of the acceleration component in a particular direction by detecting the resulting movements of a suspended mass within the unit. Generally such accelerometers include a seismic mass, a restraining means for suspending the mass, a constraining means for limiting the direction of acceleration sensitivity of the mass and means for detecting the resulting movement of the mass against the restraining means. Accelerometers of this type have been used to provide a continuous indication of acceleration of the vehicle in which the accelerometer is mounted or to detect a particular value of vehicle acceleration.

The present invention relates to the latter type of accelerometer and more particularly to an accelerometer which detects a particular vehicle acceleration, either step input or ramp input, or any continuously increasing acceleration, and provides a switch closure after a predetermined time delay. Present accelerometers which provide a switch closure at a particular value of vehicle acceleration are not satisfactory for many applications in that spurious values of acceleration produce a premature acceleration indication. Thus, accelerometers have been produced which provide an electronic time delay after a predetermined acceleration but these accelerometers have not been satisfactory for many applications in that these purely electronic time delay units are complex, bulky, and expensive.

Many applications for an accelerometer which will indicate a true steady state or a steadily increasing increment of acceleration exist. These applications include the use of an acceleration switch for safing and arming a missile wherein the arming is accomplished after the missile has traveled a safe distance from the launch area, another application of such an acceleration switch is for arming a stage separation of missile.

An object of the present invention is to provide an acceleration switch for actuation above a predetermined minimum value of acceleration which is responsive to a step input or ramp input acceleration and is unaffected by spurious values of acceleration above the predetermined value.

Another object of the present invention is to provide an acceleration switch for activation above a predetermined value of acceleration wherein the mechanism will rapidly reset upon a decrease in acceleration if said predetermined acceleration value has not existed for a predetermined time interval.

A further object of the present invention is to provide an acceleration switch with time delay for activation at a predetermined value of acceleration which is purely mechanical.

Certain of these objects are realized in the invention by the provision of a timing mechanism and an accelerometer which controls the effectiveness of the timing mechanism in accordance with acceleration history. Advantageously, the timing mechanism includes a member whose displacement, when unopposed, is indicative of time and the accelerometer controls the degree in which displacement of said member is permitted. Thus displacement of the timing member in any given degree is a selected joint function of acceleration history and time.

The foregoing and other objects and advantages of the invention will appear more fully hereinafter from a consideration of the detailed description which follows, taken together with the accompanying drawing wherein an embodiment of the invention is illustrated. It is to be expressly understood, however, that the drawing is for the purpose of illustration and description and is not to be construed as defining the limits of the invention.

The single figure of the drawing is a schematic diagram of one embodiment of the invention.

Referring now to the drawing there is shown an illustrative embodiment of the present invention wherein an acceleration responsive mechanism closes a set of electrical contacts after a predetermined time delay following the exceeding of a particular value of acceleration. In the drawing the numeral 10 designates an accelerometer switch having a housing 11 with end closures 12 and 14. The accelerometer mechanism is symmetrical around the sensitive axis (line X—X) and is responsive to positive acceleration forces along the sensitive axis X—X in the direction of end 12 from end 14.

Mounted within housing 11 is a mass support member 15 and mounting member 16. Housing 11, end closure 14, and mounting member 16 provide a hermetically sealed encasement for mass damping fluid 18 which advantageously may be a silicone oil. Acceleration mass 19 is axially aligned within the housing 11 and includes an axially aligned ball bushing 20 mounted therein and disposed to receive cylindrical end 21 of member 15. Ball bushing 20 and cylindrical end 21 are disposed to guide the movement of the acceleration mass 19 and are advantageously designed to reduce friction upon the movement of the mass 19.

Adequate diametrical clearance is provided between acceleration mass 19 and the inside wall 22 of housing 11 so that the damping forces on the mass 19 are negligible.

Adjustable frame 24 is mounted within housing 11 and is disposed for axial movement relative thereto. Acceleration mass compression spring 25 is centered on acceleration mass 19 and mass support member 15 and held in compression by means of adjustable frame 24. Axial movement of the frame 24 in the housing 11 provides an adjustment for the initial preload spring force of compression spring 25 and thus determines the inertia force upon which mass 19 will begin to move along the sensitive axis X—X.

The invention employs a mechanism for measuring elapsed time which advantageously is represented as a mechanical displacement. It is now preferred that the timer operate on the dashpot principle and such a timer is included in the embodiment selected for illustration. It includes the damping fluid 18 and means for pumping the fluid from one place to another. This means comprises, in the case shown, spring 28 and the fluid displacer or pump or timing member 26.

Timing member 26 is axially aligned within housing 11, the diametrical clearance between member 26 and the inside wall 22 of housing 11 is small thereby providing a high damping force upon the movement of the mass along the sensitive axis X—X. Timing member 26 is biased toward acceleration mass 19 by means of tension spring 28. Spring 28 is fastened to mass 19 and acts on member 26 through rod 29, nut 30, and insulation 31. Within the purview of the invention, spring 28 may be fixed to the housing 11 thereby providing a constant spring force to timing member 26. Timing member 26 includes air pockets 32 thereby making member 26 substantially buoyant in the damping fluid 18 and substantially unaffected by inertia forces.

A flapper type check valve 34 is mounted on the timing member 26 and disposed between said mass and acceleration mass 19. Check valve 34 provides heavy damping on the timing member 26 when it moves along the sensitive axis X—X toward end 14 and light damping on the movement of the member 26 in the reverse direction.

Temperature variations are compensated by disc 35 mounted on member 16, disc 35 provides adequate space for the expansion of the damping fluid 18 at high temperatures thus providing uniform damping for continuous operation over a wide temperature range. Ring 35 may be advantageously made of neoprene sponge rubber.

Electrically, shunting ring 36 is mounted on timing member 26 and insulated therefrom by means of insulation 31 and 38. Two pair of cantilever contacts, monitor contacts 39 and 40 and switching contacts 41 and 42 are mounted in adjustable frame 24 and are preloaded against the timing mass to prevent contact flutter, in addition the damping fluid 18 aids in preventing contact flutter. Electrical connector 44 is disposed through housing 11 and includes three feed-through elements 45, 46, and 47. Element 45 is connected to contacts 40 and 41 by means of insulated feed wire 48, element 46 is connected to contact 39 by means of insulated feed wire 49 and element 47 is connected to contact 42 by means of insulated feed wire 50.

Adjustable limit stop 51 is disposed through support member 15 for limiting the travel of acceleration mass 19.

The parameters of the invention will be more fully understood by the following operational description of the invention which will include values for time and inertia forces, these values should not be taken as an expression of the limits of the invention but are for the purpose of more clearly illustrating a specific application of the invention.

The present invention provides a proper time delay after a predetermined value of acceleration has been reached, regardless of the type of input acceleration (acceleration vs. time history). The operational description will be illustrated with both a step input (instantaneous) acceleration and a ramp input (constant $g$/sec.) acceleration. For the purpose of illustration, a time delay of 0.250 second with a step input from zero to $4.25g$ and a bias level of $3.75g$, will be used.

When the acceleration switch 10 is subjected to a step input acceleration of $4.25g$ (4.25 times the force of gravity) along the sensitive axis X—X in the direction of end 12 from end 14 the acceleration mass 19 moves to the end of its stroke and rests on limit stop 51. The movement of mass 19 is almost instantaneous since the damping on mass 19 is substantially less than critical value for the reasons described above. Movement of acceleration mass 19 separates mass 19 from timing member 26 thereby increasing the load in tension spring 28 above its original preload value. Timing member 26 lags acceleration mass 19 because of its buoyancy and heavy damping occasioned by the small clearance between member 26 and inner wall 22. The timing operation begins as timing member 26 begins its stroke. The monitor circuit is opened as the member 26 opens monitor contacts 39 and 40 move away from shunting ring 36. After a time delay of 0.250 second the timing member 26 completes its stroke and rests against acceleration mass 19, switching contacts 41 and 42 then provide a circuit through the shunting ring 36.

For spurious values of acceleration of $4.25g$ which fall below this value in less than 0.250 second, the timing member 26 will not complete its stroke and will return to its initial position for a new cycle of operation.

The acceleration switch of this example is specifically set for a step input of acceleration from 0 to $4.25g$ but with this same setting will operate for high step inputs. A higher step input reduces slightly the time delay if the timing member is not absolutely weightless in the fluid but the delay is maintained well within reasonable tolerances of the 0.250 second delay. The magnitude of the time delay is relatively independent of input acceleration in that the weight of timing member 26 is negligible and that the force on the member 26 by tension spring 28 is much greater than the inertia force.

When the acceleration switch 10 is set for the time and acceleration responsive figures above, a ramp input acceleration will produce substantially the same results. Acceleration mass begins to move at an input acceleration of $3.75g$ and will complete its stroke at $4.25g$ and rest on limit stop 51. Movement of acceleration mass 19 separates mass 19 from timing member 26 thereby increasing the load in tension spring 28 above its preload value. Timing member 26 lags acceleration mass 19 because of its buoyancy and heavy damping compared to the substantially undamped acceleration mass 19. Movement of timing member 26 opens the monitor circuit since the monitor contacts 39 and 40 provide a circuit through the shunting ring 36 mounted on the timing member 26.

The timing operation starts as member 26 begins to move. For a ramp input acceleration, acceleration mass 19 completes its stroke after a $4.25g$ value has been reached and closure of switching contacts 41 and 42 occurs after a time delay of slightly more than 0.250 second since the force in tension spring 28 has a smaller average force than during the response to a step input acceleration. This time delay is less than 0.250 second when measured after the time that $4.25g$ is reached. Closure of switching contacts 41 and 42 provides a circuit through shunting ring 36 mounted on the timing member 26.

In summary, the above figures for step input and ramp input accelerations will give a small variance in time delay which may be summarized by the following inequalities: time delay measured from the bias level of $3.75g$ for a ramp input is greater than 0.250 second; time delay measured from $4.25g$ for a ramp input is less than 0.250 second; time delay for step input of $4.25g$ equal to 0.250 second; time delay for step input of greater than $4.25g$ is slightly less than 0.250 second. Therefore, for some ramp input acceleration, an acceleration level in the range of $3.75g$ to $4.25g$ exists such that the time delay for closure is 0.250 second after the acceleration level is attained.

For a ramp input acceleration as above described, mass 19 and member 26 will begin to return to their initial positions at $4.25g$ for decaying acceleration and the unit will completely reset at an acceleration level of $3.75g$.

While the acceleration switch as shown in the drawing is of the construction shown and described, it is understood that the instant invention is not limited to any particular form or construction. Moreover, other changes and modifications of the novel acceleration switch contemplated herein may be made by those skilled in the art without departing from the scope of the instant invention.

We claim:

1. A dual mass acceleration responsive switch for activation above a predetermined minimum value of acceleration comprising a seismic mass movable along the sensitive axis of said switch toward a switching position, a compression spring means having a predetermined restraining force for biasing said seismic mass toward a reference position, a timing member movable along the sensitive axis of said switch toward a switching position, a tension spring means for biasing said timing member toward said seismic mass, damping means for opposing the force of said tension spring on said timing member upon the movement of said seismic mass away from said reference position, electrical contact means disposed for activation when said predetermined minimum value of acceleration is exceeded and said timing member has moved along the sensitive axis to said switching position.

2. The invention defined in claim 1 wherein said timing member is a substantially weightless timing member movable along the sensitive axis of said switch toward a switching position and substantially unaffected by gravitational forces applied along said sensitive axis.

3. The invention defined in claim 2 wherein said seismic mass is substantially unaffected by said damping means.

4. An acceleration responsive switch for actuation above a predetermined minimum value of acceleration and within a selected time delay comprising a housing having a support member disposed at one end thereof, a seismic mass supported by said member and movable along said member and the sensitive axis of said switch toward a switching position, a compression spring means on said support member having a predetermined restraining force for engaging said mass and biasing it toward a reference position, a damping fluid disposed within said housing, a substantially buoyant timing member movable along said sensitive axis toward a switching position, a tension spring interconnecting and biasing said timing member and said seismic mass, said damping fluid restraining the movement of said timing member and having substantially no effect on said seismic mass upon an acceleration force along said sensitive axis above said predetermined minimum value, cantilever electrical contact means having a fixed position relative to said housing, a shunting ring means mounted on said timing member for completing an electrical circuit when said timing member is in said reference position and completing a second electrical circuit when said timing member is in said switching position.

5. The invention defined in claim 4 including means for adjusting the position of said electrical contacts to vary said reference and switching position to change said predetermined value of acceleration and time delay independently of said acceleration switch structure.

6. The invention defined in claim 4 including flapper valve means disposed between said seismic mass and said timing member for aiding the return of said timing member to said reference position upon a decrease of acceleration below said predetermined minimum value of acceleration.

References Cited by the Examiner
UNITED STATES PATENTS

| | | | |
|---|---|---|---|
| 2,603,726 | 7/52 | McLean | 200—61.53 |
| 2,850,590 | 9/58 | Marks et al. | 200—61.53 |
| 2,997,883 | 8/61 | Wilkes | 200—61.53 |
| 3,083,276 | 3/63 | Sear et al. | 200—61.45 |
| 3,096,411 | 7/63 | Chadbrek et al. | 200—61.53 |

BERNARD A. GILHEANY, *Primary Examiner.*

ROBERT K. SCHAEFER, *Examiner.*